United States Patent
Fujiu et al.

(10) Patent No.: US 11,790,028 B2
(45) Date of Patent: Oct. 17, 2023

(54) DYNAMIC USER INTERFACE ENHANCEMENT BASED ON USER INTERACTIONS

(71) Applicant: International Business Machines Corporation, Armonk, NY (US)

(72) Inventors: Akira Fujiu, Mitaka (JP); Mihoko Hasegawa, Shinjuku-ku (JP); Tomokazu Nakamura, Tokyo (JP); Yukiko Whalen, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 399 days.

(21) Appl. No.: 17/117,745

(22) Filed: Dec. 10, 2020

(65) Prior Publication Data

US 2022/0188373 A1    Jun. 16, 2022

(51) Int. Cl.
  *G06F 3/00* (2006.01)
  *G06F 16/957* (2019.01)
  *G06F 9/445* (2018.01)

(52) U.S. Cl.
  CPC ...... *G06F 16/9577* (2019.01); *G06F 9/44505* (2013.01)

(58) Field of Classification Search
  CPC .......................... G06F 16/9577; G06F 9/44505
  USPC .................... 707/706; 715/700, 745
  See application file for complete search history.

(56) References Cited

U.S. PATENT DOCUMENTS

| | | |
|---|---|---|
| 8,930,818 B2 | 1/2015 | Cordasco |
| 9,418,172 B2 | 8/2016 | White et al. |
| 10,089,637 B2 | 10/2018 | Bredenberg et al. |
| 11,449,671 B2 * | 9/2022 | Siroker ................. G06F 16/958 |
| 2010/0095208 A1 | 4/2010 | White et al. |
| 2014/0019461 A1 | 1/2014 | Bredenberg et al. |
| 2020/0050527 A1 * | 2/2020 | Jones ...................... G06F 17/18 |
| 2020/0142582 A1 * | 5/2020 | Quinn ................. G06F 3/04883 |
| 2021/0089175 A1 * | 3/2021 | Mani ..................... G06V 10/771 |
| 2021/0092159 A1 * | 3/2021 | Crabtree ............... G06F 16/951 |

(Continued)

FOREIGN PATENT DOCUMENTS

| | | |
|---|---|---|
| CN | 109165264 A | 1/2019 |
| WO | 2012115981 A1 | 8/2012 |

OTHER PUBLICATIONS

"AI Analyst Analyzing Your Website: AI Analyst is the voice of your website data successfully combining strategic artificial intelligence", Printed Feb. 12, 2020, 7 pages, <https://wacul-ai.com/en/>.

*Primary Examiner* — Manglesh M Patel
(74) *Attorney, Agent, or Firm* — Michael A. Petrocelli

(57) ABSTRACT

A user interface (UI) enhancement system modifies a computer user interface based on user interactions recorded over time. The UI enhancement system records user interactions and develops a corresponding heat map. The heat map represents frequencies of user actions such as links clicked, scrolling actions, buttons selected, jumps within a page, etc. Based on the heat map, the UI enhancement system modifies a user interface configuration file which in turn influences the appearance and/or behavior of elements within the user interface to improve the user experience. Some embodiments give greater prominence to a UI element associated with greater "heat" and less prominence to an element with less "heat".

20 Claims, 8 Drawing Sheets

(56) References Cited

U.S. PATENT DOCUMENTS

2021/0241866 A1* 8/2021 Bhattacharya ......... G16H 40/67
2022/0375551 A1* 11/2022 Patel ...................... G06F 30/10

* cited by examiner

| HEAT MAP | K_ACTUAL | K_ROLE | K_EXPECTED |
|---|---|---|---|
| WEIGHT | 0.1 | 0.4 | 0.5 |

FIG. 4A

| UI COMPONENT | A | B | C | D |
|---|---|---|---|---|
| INITIAL SCALING FACTOR $K_{Ci}$ | 0.5 | 0.5 | 5.0 | 2.0 |
| H_ACTUAL | 0.05 | 0.05 | 0.50 | 0.40 |
| H_ROLE | 0.05 | 0.05 | 0.60 | 0.30 |
| H_EXPECTED | 0.00 | 0.00 | 0.80 | 0.20 |
| H | 0.025 | 0.025 | 0.690 | 0.260 |
| RECALCULATED SCALING FACTOR $K_{Cr}$ | 0.506 | 0.506 | 6.660 | 2.259 |

FIG. 4B

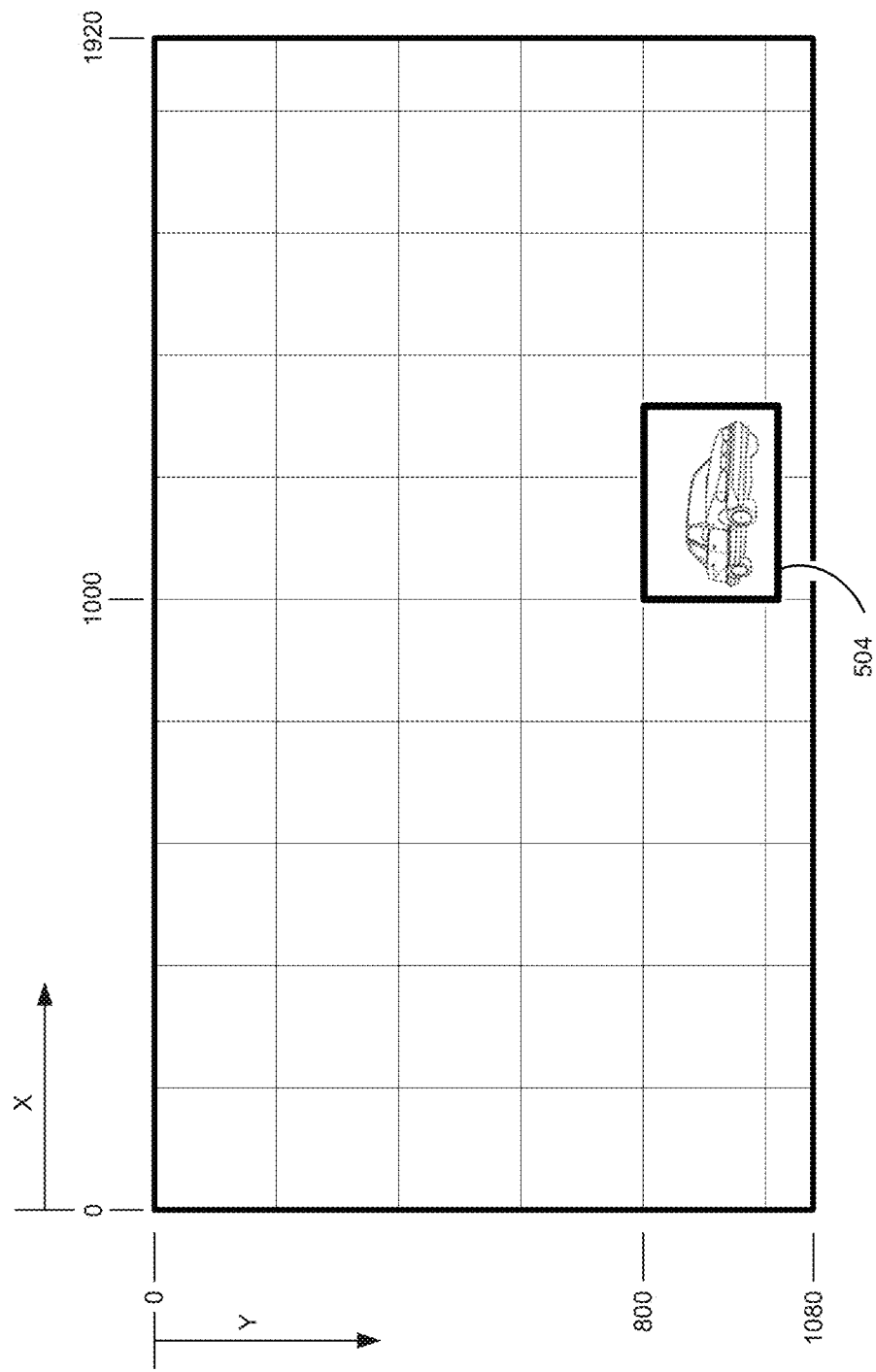

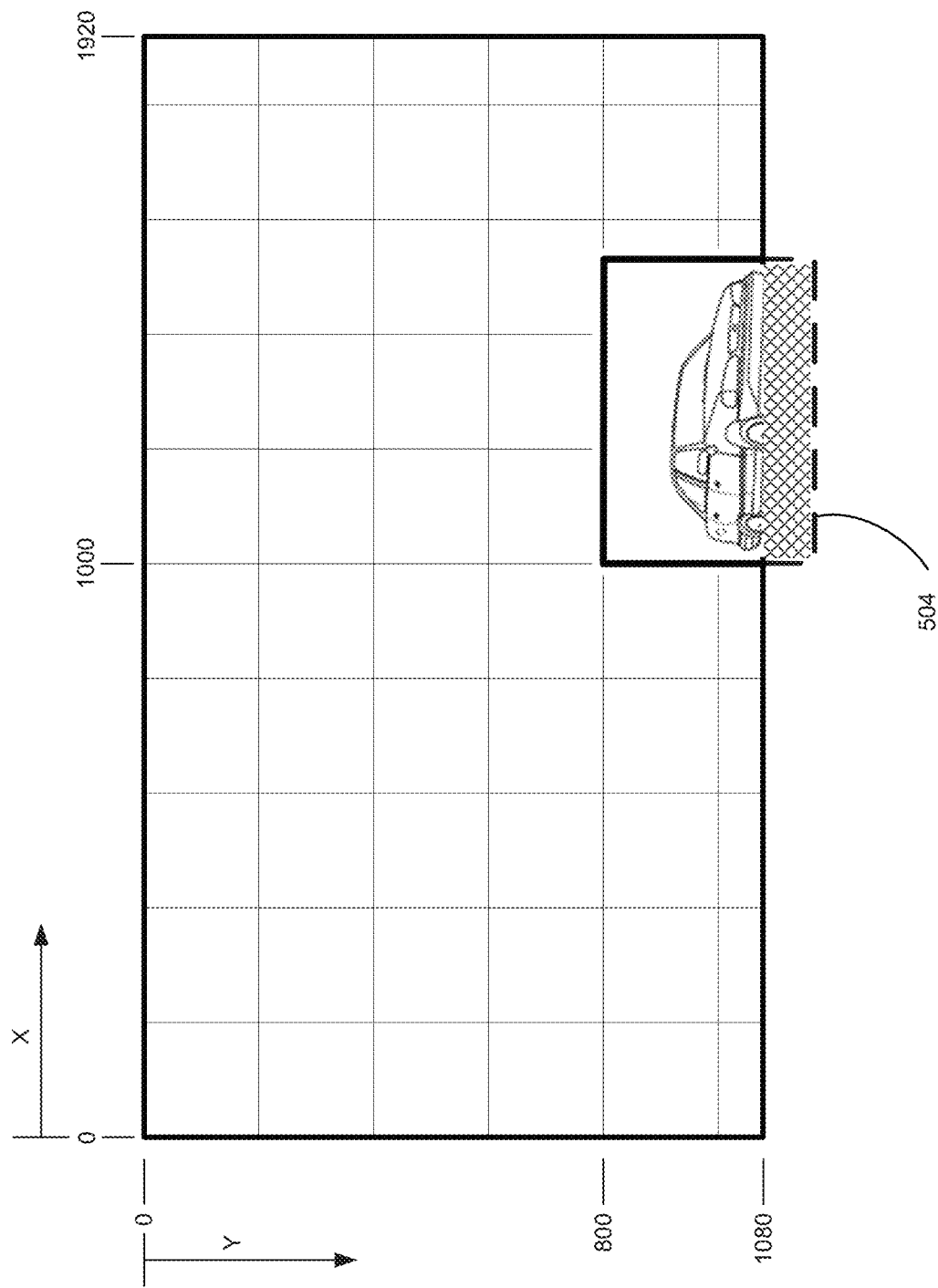

DYNAMIC USER INTERFACE ENHANCEMENT BASED ON USER INTERACTIONS

BACKGROUND

The present invention relates generally to the field of user interfaces, and more particularly to graphical user interfaces associated with mobile and stationary computing platforms.

A user interface provides a way for a user to interact with a computer or other machine. The interface generally includes one or more input devices, such as a mouse, keyboard, microphone, touch-screen display, camera, etc. by which a user sends input to the computer. The user interface generally includes one or more output devices, such as a display screen, a speaker, etc, by which the computer conveys information to the user.

SUMMARY

According to an aspect of the present invention, there is a method, computer program product and/or system that performs the following operations (not necessarily in the following order): (i) receiving a first configuration file, associated with a first user interaction dataset, with respect to a software application user interface comprising a user interface component; (ii) receiving a weighting factor dataset; (iii) sending, for presentation on a user interface device, the software application user interface configured in accordance with information in the first configuration file; (iv) receiving usage data with respect to user interaction with the software application user interface; (v) generating a second user interaction dataset based on the usage data; (vi) computing a weighted average user interaction dataset, based on information in (a) the first user interaction dataset, (b) the second user interaction dataset, and (c) the weighting factor dataset; (vii) generating a second configuration file based on the weighted average user interaction dataset; and (viii) sending, for presentation on the user interface device, the user interface component configured in accordance with information in the second configuration file.

BRIEF DESCRIPTION OF THE DRAWINGS

FIG. 4A table showing information that is helpful in understanding embodiments of the present invention;

FIG. 4B table showing information that is helpful in understanding embodiments of the present invention;

FIG. 5A is a screenshot of a user interface in accordance with at least one embodiment of the present invention;

FIG. 5B is a screenshot of a user interface in accordance with at least one embodiment of the present invention;

DETAILED DESCRIPTION

Figure 1:
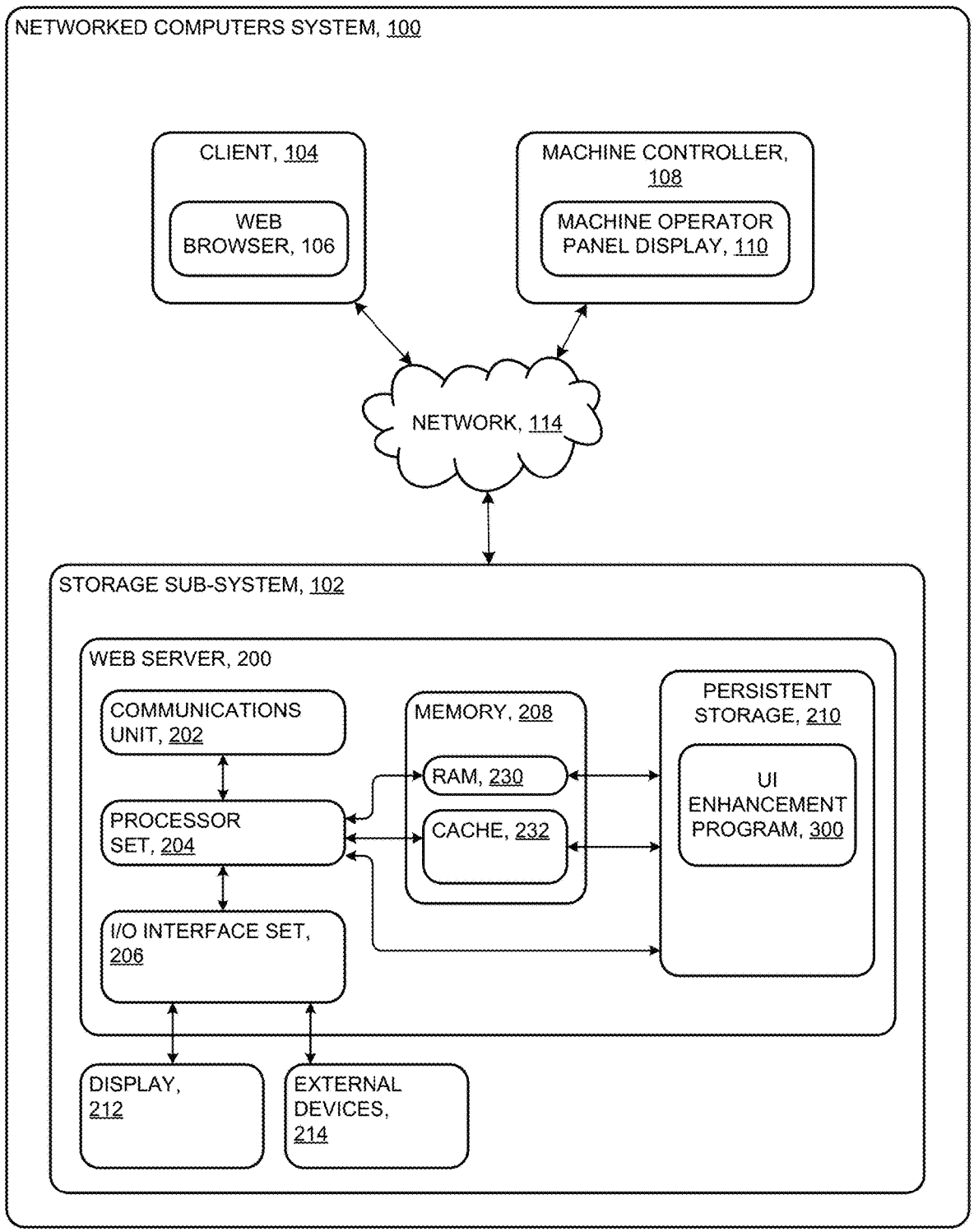
FIG. 1 is a block diagram of a embodiment of a system in accordance with at least one embodiment of the present invention.

In some embodiments of the present invention, a user interface (UI) enhancement system dynamically modifies a computer user interface based on user interactions recorded over time. The UI enhancement system observes user interactions and develops a corresponding heat map. The heat map represents user actions such as links clicked, scrolling actions, etc. Once a predetermined time period elapses, the UI enhancement system dynamically modifies the user interface, based on the heat map, to improve the user experience. For example, the UI enhancement system gives greater prominence to a UI element associated with greater "heat" and less prominence to an element with less "heat".

This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: storage sub-system 102; client 104; web browser 106; machine controller 108; machine operator panel display 110; communication network 114; web server 200; communications unit 202; processor set 204; input/output (I/O) interface set 206; memory device 208; persistent storage device 210; display device 212; external devices 214; random access memory (RAM) devices 230; cache memory device 232; and user interface enhancement program 300.

Storage sub-system 102 is, in many respects, representative of the various computer sub-system(s) in the present invention. Accordingly, several portions of storage sub-system 102 will now be discussed in the following paragraphs.

Storage sub-system 102 may be a laptop computer, tablet computer, netbook computer, personal computer (PC), a desktop computer, a personal digital assistant (PDA), a smart phone, or any programmable electronic device capable of communicating with the client sub-systems via communication network 114. User interface enhancement program 300 is a collection of machine readable instructions and/or data that is used to create, manage, and control certain software functions that will be discussed in detail, below, in the Example Embodiment sub-section of this Detailed Description section.

Storage sub-system 102 is capable of communicating with other computer sub-systems via communication network 114. Communication network 114 can be, for example, a local area network (LAN), a wide area network (WAN) such as the Internet, or a combination of the two, and can include wired, wireless, or fiber optic connections. In general, communication network 114 can be any combination of connections and protocols that will support communications between server and client sub-systems.

Storage sub-system 102 is shown as a block diagram with many double arrows. These double arrows (no separate reference numerals) represent a communications fabric, which provides communications between various components of storage sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory device 208 and persistent storage device 210 are computer-readable storage media. In general, memory device 208 can include any suitable volatile or non-volatile computer-readable storage media. It is further noted that, now and/or in the near future: (i) external devices 214 may be able to supply, some or all, memory for storage sub-system 102; and/or (ii) devices external to storage sub-system 102 may be able to provide memory for storage sub-system 102.

User interface enhancement program 300 is stored in persistent storage device 210 for access and/or execution by one or more of the respective computer processor set 204, usually through one or more memories of memory device 208. Persistent storage device 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage device 210.

User interface enhancement program 300 may include both machine readable and performable instructions and/or substantive data (that is, the type of data stored in a database). In this particular embodiment, persistent storage device 210 includes a magnetic hard disk drive. To name some possible variations, persistent storage device 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage device 210 may also be removable. For example, a removable hard drive may be used for persistent storage device 210. Other examples include optical and magnetic disks, thumb drives, and smart cards that are inserted into a drive for transfer onto another computer-readable storage medium that is also part of persistent storage device 210.

Communications unit 202, in these examples, provides for communications with other data processing systems or devices external to storage sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with web server 200. For example, I/O interface set 206 provides a connection to external devices 214. External devices 214 will typically include devices such as a keyboard, keypad, a touch screen, and/or some other suitable input device. External devices 214 can also include portable computer-readable storage media such as, for example, thumb drives, portable optical or magnetic disks, and memory cards. Software and data used to practice embodiments of the present invention, for example, user interface enhancement program 300, can be stored on such portable computer-readable storage media. In these embodiments, the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature, herein, is used merely for convenience, and, thus, the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
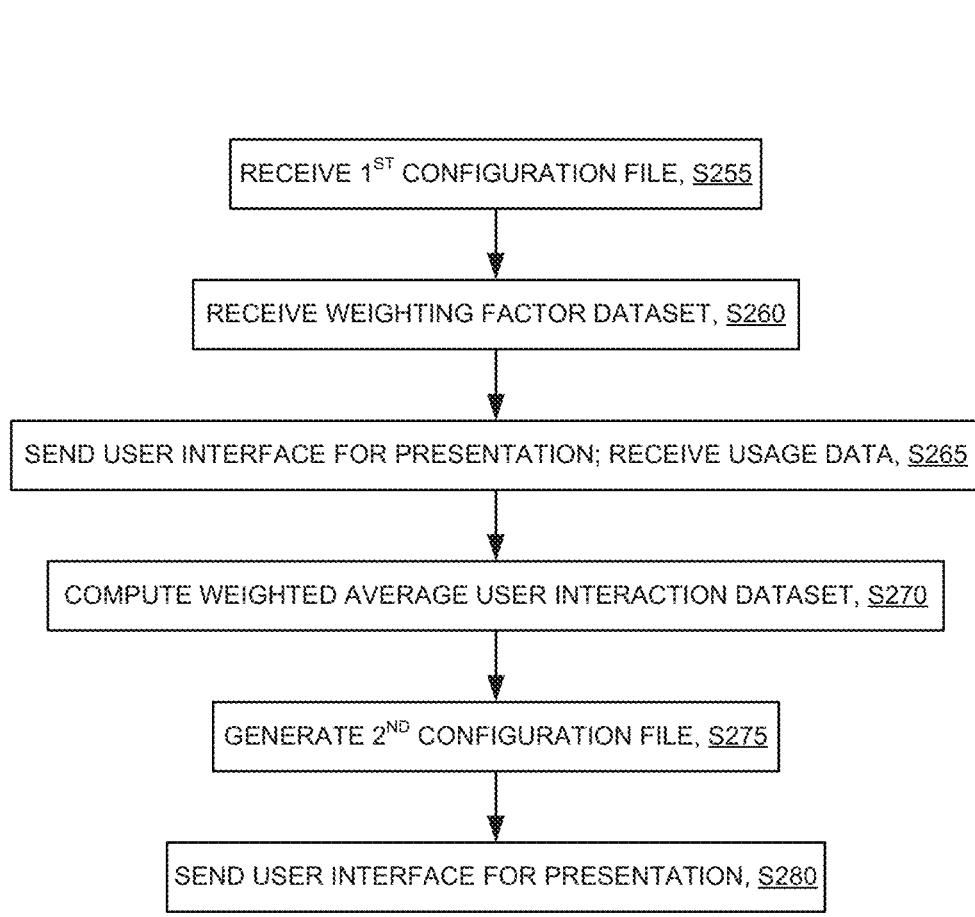
FIG. 2 is a flowchart showing a method performed, at least in part, in accordance with at least one embodiment of the present invention.
Figure 3:
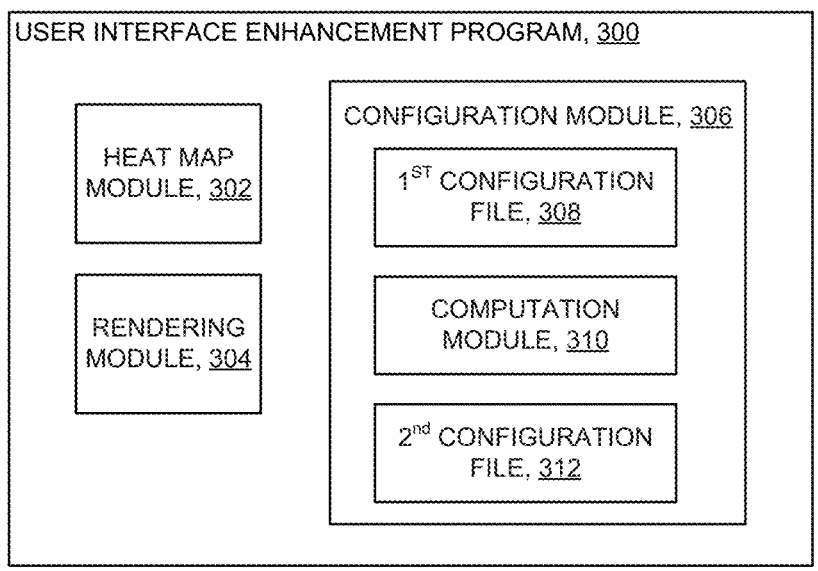
FIG. 3 is a block diagram showing a machine logic (for example, software) portion of a system in accordance with at least one embodiment of the present invention.

FIG. 2 shows flowchart 250 depicting a method according to the present invention. FIG. 3 shows user interface enhancement program 300 for performing at least some of the method operations of flowchart 250. This method and associated software will now be discussed, over the course of the following paragraphs, with extensive reference to FIG. 2 (for the method operation blocks) and FIG. 3 (for the software blocks).

Processing begins at operation S255, where configuration module 306, receives first configuration file 308. First configuration file 308, of configuration module 306, of user interface enhancement user interface enhancement program 300, influences various aspects of the presentation of a software user interface design, such as layout and overall appearance, and the appearance of individual elements of the user interface. In some embodiments, configuration file 308 comprises a cascading style sheet (CSS) file or a grouping of CSS files. In some embodiments, configuration file 308 comprises one or more extensible markup language (XML) schemas. It is to be understood that configuration file 308 is not limited to CSS files or XML schemas, but may be any file or dataset developed to govern or influence the appearance of a software application user interface.

In some embodiments, configuration file 308 is created by a software developer. In some embodiments, configuration file 308 is generated by machine logic (such as an artificial intelligence module) working independently, or in concert with a developer and/or other individual(s) who are involved in the design of the software user interface. In some embodiments, configuration file 308 is generated by specialized software such as software for building web sites, generating panels for automated machinery, or any other type of user interface.

Processing proceeds at operation S260, where computation module 310, of configuration module 306 receives a weighting factor dataset. Some embodiments of the present invention consider usage information from more than one heat map (or type of heat map), for example, an "expected" heat map(s), "role-based" heat map(s), and/or "experiential" heat map(s).

In some embodiments, for a web site, for instance, an expected heat map may be created by the web developer where the expected heat map predicts user behavior (user interaction) with respect to a particular web page, or set of web pages. The expected heat map may encompass the developer's expectations, or a client's requirements with respect to user interactions with the web site.

A role-based heat map may result from user interactions with the web site where the users are developers, testers, subject matter experts, or any other classification of user. A particular user interface may accrue one or more role-based heat maps as a web site progresses through design, generation, and testing phases.

An experiential heat map (sometimes herein referred to as an "actual heat map") accrues by observation and recording of general user interactions with a user interface, where the general users are those persons at whom the web site (or any other user interface) is directed. For example, a machine control user interface may be directed to a computer numerical controlled (CNC) machine operator, whereas a web site may be directed to a general population of web surfers interested in sports news.

The weighting factor dataset contains information assigning a weight to each type of heat map (such as expected, role-based, and experiential, see above). Each weight is an expression of importance assigned to each type of heat map, and determines how much influence each type of heat map is given over the design of the associated user interface. See FIG. 4A for an example weighting factors dataset, where K_ACTUAL=0.1 means an experiential heat map (also called an actual heat map) contributes 10% to a weighted average heat map, whereas K_EXPECTED=0.5 means an expected heat map contributes 50% to the weighted average. Further details are provided below in the Further Comments and/or Embodiments subsection of this Detailed Description section.

Processing proceeds at operation S265, where rendering module 304, and heat map module 302, both of user interface enhancement user interface enhancement program 300, operate in concert to render a user interface on a display device (rendering module 304) and receive back usage data with respect to user interactions with the user interface (heat map module 302).

Processing proceeds at operation S270, where computation module 310 of configuration module 306 computes a weighted average user interaction dataset (weighted average heat map) based on the different types of heat maps involved (see above with respect to operation S260), and the weighting factors dataset.

Processing proceeds at operation S275, where computation module 310 generates second configuration file 312, based on first configuration file 308, the weighted average heat map computed above with respect to operation S270, and a monotonically increasing function (such as a sigmoidal function, for example a hyperbolic tangent function). Further details are provided below in the Further Comments and/or Embodiments subsection of this Detailed Description section.

Processing proceeds at operation S280, where rendering module 304 sends the user interface, based on second configuration file 312, to a user interface device for display or other presentation (for example, audio) to a user.

III. Further Comments and/or Embodiments

In some embodiments of the present invention, a heat map graphically represents user interactions, for example with a web page, observed over time, and over any number of user encounters. The heat map, in some embodiments, represents relative frequencies of user actions with respect to certain elements on the web pages of a website, particularly scrolling actions, links followed, pages viewed, time spent on each page, etc.

In some embodiments, one or more developers create a desired, or expected, heat map based on their expectations for user interactions with, for example, an application embedded in a web page. The developers integrate the expected heat map into a configuration file which influences the appearance of the user interface in various display devices. Once the web page is deployed, and multiple users interact with the application, a user interface enhancement system develops an experiential heat map based on the user interactions. If significant differences develop between the expected and experiential heat maps, the interface enhancement system modifies the interface configuration file based on the differences, which in turn provides a basis for modifying the user interface.

Note: In some embodiments, the term "developer" refers to a person or persons. In other embodiments, "developer" refers to a computer system, such as an automated intelligence system. In still other embodiments, "developer" refers to any combination of person(s) working in conjunction with machines.

In some embodiments, a configuration file includes information corresponding to various elements of a web page or other user interface presentation, such as size, position, and (for elements designated as scalable and/or movable) permissible ranges thereof. A configuration file may also include information pertaining to animation effects, color, font and font style, and myriad other parameters associated with presentation of various user interface elements.

In some embodiments, the UI enhancement system automatically (dynamically) modifies the configuration file, and consequently the appearance and/or behavior of the web page and/or application included thereon. In some embodiments, the configuration module presents one or more variants of modified configuration files, along with the experiential heat map, to a developer. The configuration module requests developer input as to whether or not the developer elects to deploy an updated interface. In some embodiments, the system presents the developer with options such as: (i) continuing to use the currently active configuration file; (ii) reinstating a previously active configuration file; (iii) activating a modified configuration file; (v) choosing one of the one or more variants of the configuration file (and the resulting rendered UIs) presented by the UI enhancement system; and/or (v) manually reconfiguring and activating a modified configuration file, etc.

In some embodiments, eye-tracking functionality (for example, based on input from an image capture (camera) device) records which areas of a web page receive more user attention and for how long, and which areas receive less user attention. The heat map associates greater "heat" with areas of a web page that receive relatively more user attention (such as links selected, text read, time viewing text and/or graphics, etc.) and less "heat" for areas that receive relatively less or no user attention.

In some embodiments, the heat map represents the various "heat" measurements as semi-transparent colors overlaid on the associated web page. That is, greater heat may be represented by red, lesser heat by yellow, and the least amount of heat by blue, or no coloration at all. (Of course, the choice of colors is arbitrary and without limitation.) For example, a red zone may be overlaid on the headline and first paragraph of a three-paragraph news story, yellow overlaid on the second paragraph, and blue over the last, respectively signaling that most readers take in the headline and first paragraph, some readers continue on to the second paragraph, while few readers bother to read the whole story. A red zone overlaid on a link embedded in the second paragraph of the story may indicate that many readers jump to the linked page. This could provide some insight as to (i) why the third paragraph is not read as often as the first and second ones, and (ii) the interest users have in following the link. Other insights that may be learned from the heat map include the effectiveness of advertisement placements, size, graphic design, etc.

In some embodiments of the present invention, the heat map is represented as an array of numerical values, and not necessarily rendered on a display device. The interface enhancement system reads the array and performs functions based thereon.

In some embodiments, the interface enhancement system dynamically varies components of a user interface (sometimes herein referred to as user interface components, UI components, user interface elements, UI elements, or similar terms), based at least on click-tracking heat map data, to improve a user experience connected with use of a web site, web pages included therein, or any computer application whether hosted within a web site or not.

An illustrative example follows, showing an approach in accordance with some embodiments of the present invention, for developing a web page user interface and refining the configuration of the interface based on user interactions: (i) developer prepares web page; (ii) developer defines expected heat map for web page; (iii) developer generates configuration file based on expected heat map; (iv) developer deploys web page; (v) rendering engine (for example, web browser) renders web page based on configuration file; (vi) heat map system tracks user interaction for predetermined time period, generates actual heat map based thereon; (vii) configuration system modifies configuration file based on actual heat map and/or differences between expected and actual heat maps; and/or (viii) rendering engine updates configuration of web page (user interface) based on modified configuration file.

Further with respect to item (vi) in the paragraph above, the developer predetermines the basis for the time period based on at least one factor, of a variety of factors that include (without limitation): (a) a number of users who interact with the web page; (b) a fixed length of time; and/or (c) a length of time sufficient for the heat map to stabilize within a meaningful tolerance level. In some embodiments, a given area on a heat map can be expected to asymptotically approach a stable value over time, as sufficiently many user interactions take place. In some embodiments, if general user behavior changes over time, the stable value may shift. In response, configuration system may update the configuration file, further modifying the user interface in keeping with changing user behavior. Further with respect to item (viii) in the paragraph above, in some embodiments, the rendering engine presents the updated web page configuration to new users, and not to current users, so as to avoid confusing or surprising current users with a web page that is unexpectedly re-configured during a live session.

Some embodiments of the present invention perform an approach, for a software product application, comprising the following operations: (i) prepare initial user interface and configuration file; (ii) define expected heat map; (iii) deploy application, render initial user interface, generate experiential heat map; (iv) generate modified configuration file based on experiential heat map; and/or (v) re-render the user interface in accordance with the modified configuration file. Discussion of the operations enumerated above now follows.

(i) Prepare Initial User Interface and Configuration File:

A developer writes user interface (UI) code, such as hypertext markup language (HTML) code. The user interface comprises UI components (for example, graphics, iframes, buttons, forms, text/numeric input fields, radio buttons, checkboxes, groupings of the aforementioned, etc.) in accordance with the rules listed below. A rendering engine draws the user interface on display screens in accordance with a configuration file into which properties of the UI components have been written.

UI component properties comprise an attribute specifying whether a component position within the UI is fixed or movable. When fixed, the UI component is not permitted to intersect with (overlap) another UI component. When configured as "movable", the UI component properties include a movable range, a scaling factor (sometimes called a "scaling degree" or similar terminology), and/or a priority (z-index), all of which may have default values. These values can be set and modified by the developer and/or configuration module 306 of user interface enhancement user interface enhancement program 300 (see FIG. 3).

Relationships between UI components: UI components that are expected to have the same behavior are conceptually grouped together and a group identifier (group ID) is assigned to each UI component of the group.

The developer introduces a plugin (a software module) that analyzes pages of the product. Frequencies of the users clicking UI components, when transitioning between pages, is obtained as a heat map.

Usage by the developer is obtained as a desirable heat map, sometimes herein referred to as an "expected heat map".

(ii) Define Expected Heat Map:

The UI components are represented by a one-dimensional vector $c=(c_1, c_2, \ldots, c_n)$. An example of heat map is $c=(0.05, 0.1, \ldots, 0.8)$. An averaged heat map obtained over time from end users is denoted by $H_{ACTUAL}$; and a heat map obtained from developers is denoted by $H_{EXPECTED}$. Users are clustered based on the heat maps (vectors c) of users and each user is assigned a role (developer, tester, end user, merchant, customer, etc.). Alternatively, when attribute information indicative of roles of users is available in the system, this attribute information is used without performing clustering. A heat map corresponding to a particular role, $R_i$, is denoted by $H_{Ri}$.

Note: In some embodiments, a scaling factor is based on the role and/or the expertise of the user. This means users acting in different roles may be presented with differently configured user interfaces. For example, an accounting manager, an auditor, and a data entry specialist would each be presented with a respectively configured user interface, based on the user's role. The same holds true for a web site developer, a beta tester, and an end user of the web site application.

(iii) Deploy Application, Render Initial User Interface, Generate Experiential Heat Map:

In some embodiments of the present invention, a user accesses a web page comprising any software application, such as, for example, applications for network management, email, database interaction, software development, equipment/building maintenance, inventory management, machine operation, real estate management, financial management, drawing, chat, media playing, gaming, and so on.

In some embodiments of the present invention, the rendering engine operates in an event-driven manner and is triggered by user input and/or context. The rendering engine renders the UI code as produced by the developer.

In some embodiments of the present invention, a heat map is defined as ratios of click frequencies for the various UI components. For example, assume that over a certain time period, UI component A receives 150 clicks, and UI component B receives 50 clicks. The total number of clicks is 150+50=200. The ratio for component A therefore is 150/200=0.75, and for component B, is 50/200=0.25. Therefore, in the present example, the experiential heat map is based on the ratios, where component A is associated with 3 times greater "heat" (meaning 3 times more clicks) than component B (0.75/0.25=3).

(iv) Generate Modified Configuration File Based on Experiential Heat Map:

In some embodiments of the present invention, a heat map system generates a new configuration file. Settings associated with each UI component may be modified, based on one or more of the following heat maps: (i) $H_{ACTUAL}$; (ii) $H_{ACTUAL}$ and $H_R$ in combination; (iii) $H_{ACTUAL}$ and $H_{EXPECTED}$ in combination; and/or (iv) $H_{ACTUAL}$, $H_{Ri}$, and $H_{EXPECTED}$ in combination, where:

$H_{ACTUAL}$ (sometimes herein referred to as experiential heat map) is a heat map obtained and averaged over time (or otherwise characterized and/or summarized) based on usage by end users in a production environment;

$H_R$ is a role-based heat map obtained and averaged over time (or otherwise characterized and/or summarized) based on user roles; and $H_{EXPECTED}$ is a heat map that may be obtained by simulation, or testing of the application under development. In some embodiments, $H_{EXPECTED}$ is based on developer prediction, intuition, experience, and/or other means. Without regard as to how $H_{EXPECTED}$ is arrived at, it is a prediction associated with the initial release of the application into a production environment. $H_{EXPECTED}$ may prove to be accurate or not, determined ultimately by the average (or typical) behavior of end user interactions observed and accumulated over time. In some embodiments, the heat map system generates a modified configuration file, or declines to generate the same, based at least in part, on a degree of divergence or agreement between $H_{ACTUAL}$ and $H_{EXPECTED}$.

(v) Re-Render the User Interface in Accordance with the Modified Configuration File:

In some embodiments of the present invention, when certain conditions are satisfied, the rendering engine re-renders the user interface on the display screen in accordance with the modified configuration file. In some embodiments, the rendering engine operates in an event driven manner. The rendering engine re-renders the screen in accordance with the initial UI and the modified configuration file.

Logic for Generating a New or Modified Configuration File.

Some embodiments generate a single heat map vector, based on a weighted average of a plurality of heat maps. A developer predetermines coefficients K, used for the weighted average. An example of using a plurality of three types of heat maps (experiential, role-based, and expected) is presented below. Heat map module 302 (see FIG. 3) calculates a weighted average for each UI component, to determine a respectively corresponding element in a single heat map vector as follows:

$$H=(K_{ACTUAL} \times H_{ACTUAL})+(K_R \times H_R)+(K_{EXPECTED} \times H_{EXPECTED})$$

where:

H=the weighted average heat map vector;

$K_{ACTUAL}$, $K_R$, $K_{EXPECTED}$ represent developer-determined weighting factors as follows:

$K_{ACTUAL}$=weighting factor associated with a general user experiential heat map (see $H_{ACTUAL}$ below);

$K_R$=weighting factor associated with a role-based experiential heat map (see $H_R$ below);

$K_{EXPECTED}$=weighting factor associated with a predicted general user heat map (see $H_{EXPECTED}$ below);

a. $H_{ACTUAL}$=experiential heat map (determined by general end-user interactions in the application production environment);

$H_R$=developer-determined role-based heat map (Heat map(s) emergent from observations of user interactions where the users are classified by role, such as developer, tester, general user); and $H_{EXPECTED}$=heat map based on a developer's (or a development team consensus) prediction of end-user interactions.

Configuration module 306 (see FIG. 3) recalculates movable UI component properties (such as location and scaling factor), based on the experiential heat map. In some embodiments, configuration module 306 increases a scaling factor associated with a UI component having greater heat (a "hotter" UI component, for example having received more clicks relative to another UI component) than a UI component having relatively lesser heat (a "cooler" UI component, for example having received fewer clicks). Configuration module 306 keeps unchanged, or reduces, a scaling factor associated with the cooler UI component. Alternatively, or in combination with the modified scaling factor(s), configuration module 306 may modify the location of the hotter UI component, so as to place it in a more prominent location on the user interface as compared to the cooler UI component. A hotter UI component corresponds to a heat map vector element with a larger value calculated in step 1, and vice versa, with respect to a cooler UI component.

Recalculated scaling factors and location parameters are limited by upper and lower limits in accordance with the movable range (for example defined by a developer and/or limited by factors such as size, type, and orientation of a display device). Configuration module 306 (see FIG. 3) creates a new configuration file based on the recalculated scaling factors, and/or location parameters. When two UI components with the same priority overlap, configuration module 306 gives higher priority to the hotter UI component (meaning a having a higher usage frequency) in the user interface over the cooler UI component. For example, configuration module 306 modifies configuration file 308 (see FIG. 3) in such a way as to afford more display prominence to the hotter UI component than to the cooler UI component.

Prominence of a UI component may be determined by factors such as a size parameter, a location parameter, a color parameter, a brightness parameter, a contrast parameter, an animation parameter, a sound parameter, an angular orientation parameter, an auto-play parameter, a delay parameter, and/or any other characteristic for attracting a user's attention. Further with respect to the aforementioned delay parameter, in some embodiments, a UI component is absent from the user interface for a time delay period, after which the UI component appears. Alternatively, in some embodiments, the UI component is displayed within the user interface for the time delay period, after which the UI component disappears from the user interface, moves to another location in the user interface, changes size within the user interface, or undergoes any other change in appearance or behavior.

In some embodiments, if a certain "under performing" (cooler) UI element receives less heat than is commensurate with the importance of the element as determined by a developer, web site owner, and/or other responsible party, configuration module 306 gives updates configuration file 308 so as to give more prominence to the cooler element. In some embodiments, relative importance of UI elements is encoded within configuration file 308.

FIGS. 4A and 4B show inputs and results of example calculations, in accordance with some embodiments of the present invention, to determine weighted average heat map values for user interface components A, B, C, and D of a web page for display in a web browser.

FIG. 4A tabulates developer-specified weighting factors for three heat maps: (i) K_ACTUAL (0.1), applies to an experiential heat map; (ii) K_ROLE (0.4), applies to a role-based heat map; and (iii) K_EXPECTED (0.5), applies to a developer-predicted heat map. With respect K_ROLE and K_EXPECTED, these weighting factors embody the developer's judgement as to the relative impact afforded to different heat maps in shaping the user interface. K_ACTUAL is determined by end user interactions with the web page user interface. The weighting factors (K_ACTUAL, K_ROLE, and K_EXPECTED) represent judgement applied by the developer as to the relative contributions that will be made by respectively corresponding heat maps (H_ACTUAL, H_ROLE, and H_EXPECTED) in recalculating scaling factors ($K_{Cr}$, discussed below, beginning with the following paragraph).

FIG. 4B tabulates the aforementioned heat map values corresponding to four UI components (A, B, C, and D) of a web page. Row 410 (INITIAL SCALING FACTOR $K_{Ci}$) tabulates initial scaling factors for the respective UI components. A developer of a web page UI determines initial scaling factors for various components within the UI, taking into consideration general UI design principles, overall visual appearance, web site specific design rules, web page content, etc. In some embodiments, initial scaling factors KCi are assumed to be unity (1.0).

Row 411 (H_ACTUAL) tabulates experiential heat map results, collected over an observation time period, generated by interactions of end users with the web page in a production environment (for example, deployed on the internet). Heat map module 302 (FIG. 3) generates the experiential heat map values by observing general end-user interactions with the UI in one or more production environments.

Row 412 (H_ROLE) tabulates role-based heat map values. In some embodiments, Heat map module 302 (FIG. 3) determines role-based heat map values during a development cycle, where persons of various roles take part in testing and/or simulating interaction with the web page UI.

Row 413 (H_EXPECTED) tabulates developer-predicted heat map results. Developer(s) of the web page UI may make predictions based on various factors including assumptions of how general end users will interact with the UI, perceived relative importance of various UI components, judgement, intuition, experience, etc.

Row 414 (H) tabulates a weighted average heat map value for each UI component, computed as shown below.

Row 415 (recalculated scaling factor $K_{Cr}$) tabulates recalculated scaling factors based on the sigmoidal function: y=(tan h(H/2))+1 where:

H is the weighted average heat map value tabulated in row 414; and

"tan h( )" is the hyperbolic tangent function, the argument of which (H/2) is expressed in radians (a dimensionless unit). In some embodiments, any monotonically increasing function (such as a sigmoidal function, for instance) may be used in place of the hyperbolic tangent function shown in the present example.

Each weighted average heat map value (H) is substituted into the sigmoidal function and then multiplied by the initial scaling factor ($K_{Ci}$). The result comprises a recalculated scaling factor ($K_{Cr}$) with respect to the corresponding UI component. Configuration module 306 updates configuration file 308 (see FIG. 3) based on the recalculated scaling factors. Rendering module 304 (see FIG. 3), when triggered to do so, re-renders the UI based on updated configuration file 308.

In some embodiments of the present invention, UI enhancement program 300 (see FIG. 3) triggers rendering module 304 to update the user interface based on various events such as (without limitation): (i) in conjunction with a UI refresh, reload, etc.; (ii) when a new user session is opened; and/or (iii) in response to clearing (automatically, or in response to user input) of browser cache memory, etc. In some embodiments, configuration module 306 sends a triggering signal, to rendering module 304, in response to a triggering input or event. Once rendering module 304 receives the triggering signal, rendering module 304 re-renders the user interface.

In some embodiments, rendering module 304 recalculates the placement coordinates of a UI element, based on a recalculated scaling factor as embodied in configuration file 308 (see FIG. 3). In some embodiments, a recalculated scaling factor leads to changes in the placement and/or appearance of a UI element. Possible changes, made singly or in any combination, of a UI element include (without limitation): (i) placement of the UI element; (ii) size of the UI element; and/or (iii) color, brightness, rotation angle, animation effects, 3-dimensional effects, surrounding background appearance, etc., to name a few. Depending on the re-calculated scaling factor (which is based on the heat map value associated with the UI element), a UI element may be modified to attract more user attention, or less user attention.

Based on the foregoing, some embodiments re-scale and/or reposition UI components based on actual end-user behavior as represented by the heat map value associated with respectively corresponding UI components.

An example follows to show how the initial scaling factor ($K_{Ci}$) of a UI element is re-calculated (to obtain $K_{Cr}$), based on the heat map value associated with the UI element. For this example, refer now to column 402 of FIG. 4B. Heat map module 302 (see FIG. 3) calculates a weighted average heat map value (H) as follows: H=($K_{ACTUAL}$×$H_{ACTUAL}$)+($K_R$×$H_R$)+($K_{EXPECTED}$×$H_{EXPECTED}$). With respect to component A, heat map module 302 determines H by substituting the values tabulated in FIG. 4A and column 402 of FIG. 4B, into the above formula as follows:

$$H=(0.1\times0.05)+(0.4\times0.05)+(0.5\times0)=0.025$$

Next, heat map module 302 (see FIG. 3) substitutes (H=0.025, calculated above), and initial scaling factor ($K_{Ci}$=0.5) as tabulated in column 402, into the formula $K_{Cr}$=(tan h(H/2)+1)×$K_{Ci}$, to obtain re-calculated scaling factor $K_{Cr}$ as follows:

$$K_{Cr}=(\tan h(0.025/2)+1)\times0.5=0.506$$

In a second example, refer now to column 406 of FIG. 4B. Heat map module 302 (see FIG. 3) similarly calculates the weighted average heat map value associated with UI component C as follows:

$$H=(0.1\times0.5)+(0.4\times0.60)+(0.5\times0.80)=0.690$$

Heat map module 302 (see FIG. 3) substitutes (H=0.690, calculated above), and initial scaling factor ($K_{Ci}$=5.0) as tabulated in column 406, into the formula, to obtain recalculated scaling factor $K_{Cr}$ as follows:

$$K_{Cr}=(\tan h(0.690/2)+1)\times5.0=6.660$$

Recalculating User Interface Component Coordinates.

In some embodiments of the present invention, properties related to screen coordinates of a movable UI component include: (i) permitted range, sometimes expressed as horizontal and vertical (respectively x and y) coordinates for top left corner (height, and width); (ii) scaling factor where, for example, original scaling factor $K_{Ci}$=5 of component C (see column 406 of FIG. 4B) scales to recalculated scaling factor $K_{Cr}$=6.660 based on the heat map; (iii) UI screen size (for example, 1920 pixels wide×1080 pixels high); and/or (iv) UI position and size, for example, upper left hand corner positioned at 900x, 1000y, width=100x, and height=50y.

Some embodiments of the present invention generate different scaling factors, one for the X (horizontal) direction, and another for the Y (vertical) direction of a user interface. In a three-dimensional user interface, a third scaling factor, may be generated as well, associated with a Z (depth) direction. In some embodiments, the different scaling factors are generated with a mathematical relationship to each other. For example the X-dimension scaling factor is equal to 110 percent of the Y-dimension scaling factor and 200 percent of the Z-dimension scaling factor. In other embodiments, the different scaling factors are generated independently from one another.

In some embodiments, a UI element, after re-scaling, falls partially or fully outside permitted bounds. Such bounds for a given element may be defined in configuration file 308 (see FIG. 3) or elsewhere. A display screen size may be considered as bounds for all elements of a UI. For instance, a screen size of 1920×1080 pixels may be considered as global bounds for all elements, whereas configuration file 308 may further define bounds within the physical limits of the screen. In some embodiments, configuration file 308 defines nested bounds, wherein a first element is restricted to appearing within the area for a second, larger element, and so on. For example, a button (a first element) positioned within a media window (a second element) displayed on a tablet computer screen display (a third element).

Figure 5C:
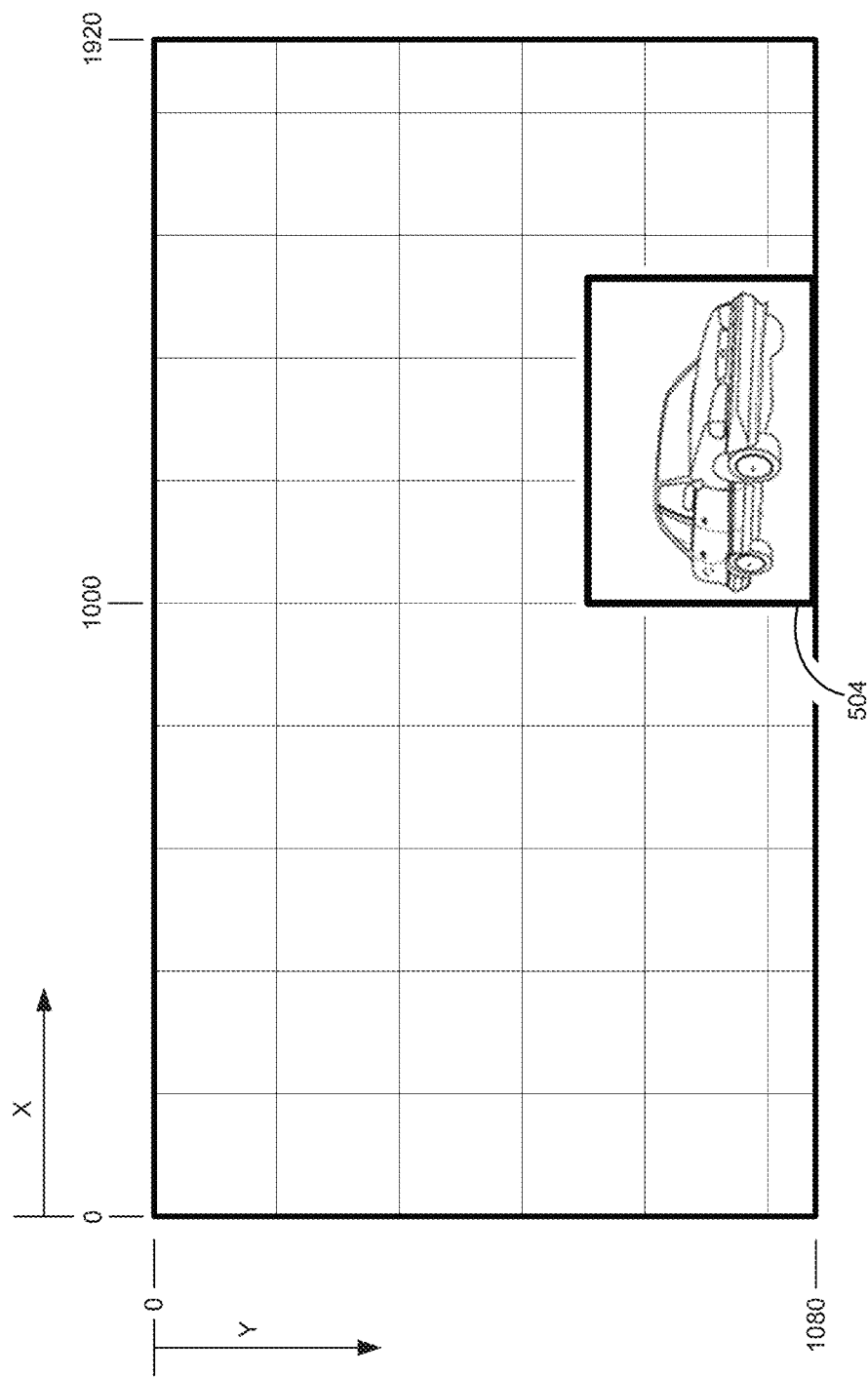
FIG. 5C is a screenshot of a user interface in accordance with at least one embodiment of the present invention.

FIG. 5A shows a UI element, graphic 504. Graphic 504 in this example may be a link to another web page (not shown), or a button that triggers an action such as causing another window to open containing information suggested by the graphic. FIG. 5A shows graphic 504 in an original configuration (size and location (top left corner at 1000x and 800y) as designed by developers of the web page on which the graphic appears, before generation of a heat map for the web page.

FIG. 5B shows graphic 504 re-scaled (enlarged), based on a heat map and subsequent scaling factor, calculated with a method in accordance with some embodiments of the present invention, such as the method discussed above with respect to FIGS. 4A and 4B. Graphic 504 location remains unchanged (top left hand corner still at 1000x and 800y). Upon application of the scaling factor, a lower portion of graphic 504 is truncated by the bottom of the display. The crosshatched portion is not visible. Truncation of graphic 504 comes about as a consequence of the combination of original location and enlarged size, such that part of graphic 504 falls below the bottom limit of the display screen.

In some embodiments, display of the web page on a different display device, for example a smart phone, may cause the re-scaled graphic 504 to display fully when the smart phone is in one orientation, and to be truncated when the smart phone is in another orientation. Some embodiments of the present invention modify configuration file 308 (see FIG. 3) differently, based on the orientation of the display screen.

Some embodiments maintain a plurality of configuration files respectively corresponding to a plurality of display types and/or sizes. The user interface as rendered on a particular display type and/or size, is based on the respectively corresponding configuration file, and is optimized, as to usability, for the particular display.

Some embodiments respond to the truncation of graphic 504 (continuing with the present example) by translating the would-be-truncated graphic upward such that the bottom edge of graphic 504 is coincident with (or above) the bottom edge of the display screen, or other bounding area such as an embedded frame.

To apply a scaling factor to a UI element, configuration module 306 (see FIG. 3) multiplies the height and width (or any appropriate measure, such as diameter, length, brightness, etc.) of the UI element by the scaling factor. Configuration module 306 stores the result(s) thereof in configuration file 308 (see FIG. 3). Once triggered, rendering module 304 re-renders (refreshes) the user interface in accordance with information in configuration file 308, thereby rendering the re-scaled UI element.

Conditions for Dynamic User Interface Update

In some embodiments, once configuration module 306 has updated configuration file 308 (based on heat map results), rendering module 304 (see FIG. 3) dynamically updates a given user interface (for example, associated with a given web page) in response to triggering events that include the following: (i) the given web page is first loaded for the user session; (ii) the user returns to the given web page after having left it; (iii) the user has viewed the given web page for a predetermined length of time; (iv) the user has viewed the given web page for a predetermined length of time and movement of the pointer (or other user-controlled indicator element, such as a cursor) is sufficiently quiescent; and/or (v) certain user input, such as a command to refresh a web page.

Further with respect to item (iv) in the paragraph above, in some embodiments, rendering module 304 determines the pointer is sufficiently quiescent based on one or more factors including: (i) elapsed time when there is no (or less than a threshold amount of) pointer movement; (ii) position, velocity and/or acceleration of the pointer; and/or (iii) lack of any user input (pointer movement, voice input, clicks, taps, gestures, etc.) over a predetermined time interval. Rendering module 304 prevents the web page (or any user interface) from being switched over (re-configured) while the user is performing certain actions such as actively interacting (scrolling, viewing embedded media, reading (as evidenced by eye tracking methods), etc.) with the web page, so as to avoid causing astonishment, confusion, disorientation, frustration, and/or surprise on the part of the user.

Rendering Engine Operation.

In some embodiments of the present invention, rendering module 304 (sometimes referred to as a rendering engine) generates a user interface based on the configuration file in conjunction with hypertext markup language (HTML) code. If the configuration file is modified and the UI is configured to enable dynamic modification, the rendering module 304 engine re-renders the UI in response to a triggering condition or event.

In some embodiments, configuration file 308 stores at least two types of settings for each element of the user interface, as follows: (i) properties of a given UI element, and of relationships between the given UI element and other UI elements; and (ii) style of the given UI element (style values are recalculated dynamically). Location coordinates, width, and height and similar properties of a UI element are stored in a format consistent with HTML style tags.

In some embodiments, configuration file 308 (see FIG. 3) includes user interface element style semantics in accordance with cascading style sheet (CSS) rules. For example, position: fixed; and "div{height: 200px; width: 50%; background-color: SlateBlue;}", etc.

In some embodiments of the present invention, in the event of changing browser window size, rendering module 304, with reference to configuration file 308 (see FIG. 3) recalculates browser window size and position in the same manner.

Figure 6:
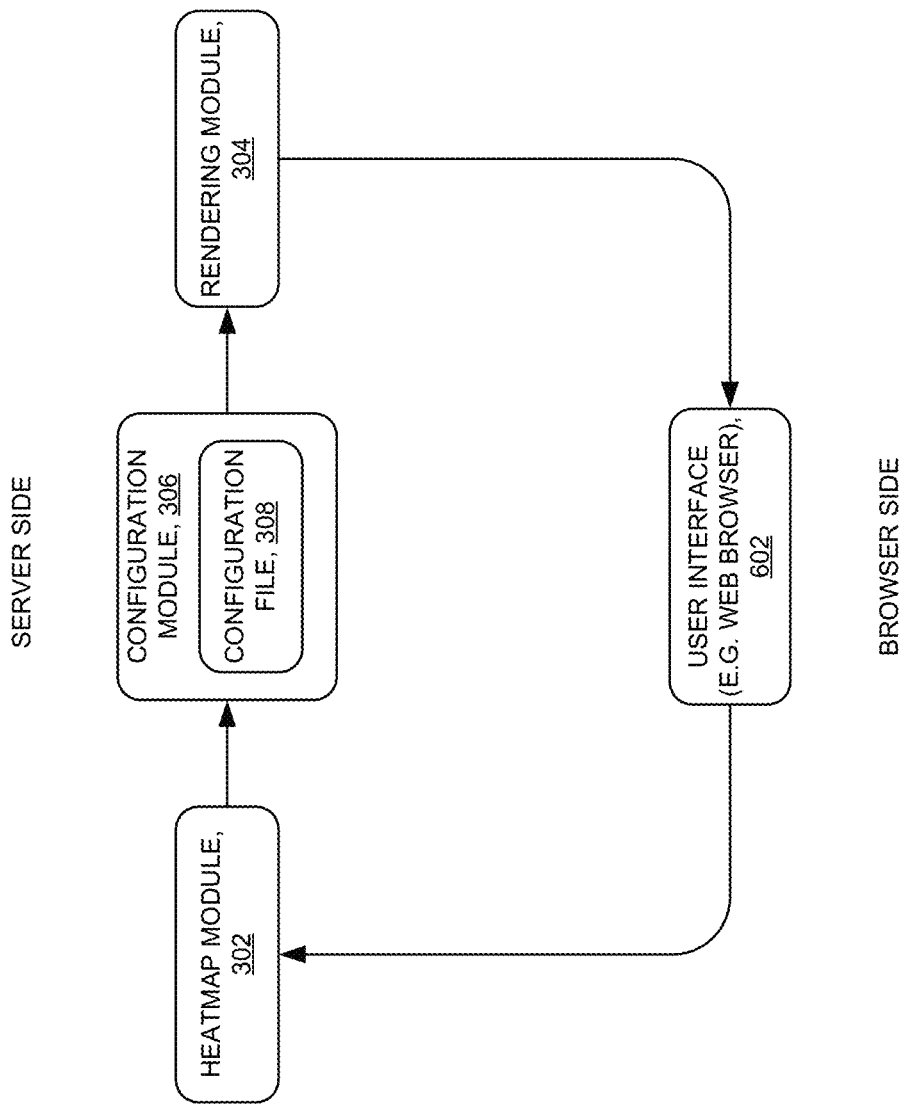
FIG. 6 is a block diagram showing data flow in accordance with at least one embodiment of the present invention.

FIG. 6 shows a system configuration block diagram in accordance with some embodiments of the present invention.

Rendering module 304 reads information in configuration file 308, and based on the information, generates user interface 602. In some embodiments the user interface comprises a web browser and/or a user interface associated with any software application. In some embodiments, a user interface associated with one software application is embedded in a user interface associated with another instance of the software application, or in another software application. For example, a web site may be displayed inside an inline frame (an HTLM "iframe") embedded in a web page displayed by another web browser.

A browser (an example of a user interface) displays a web page (or any software application user interface). If the web page is deployed in a production environment, it means, for example: (i) the web page is deployed on the internet and made "live"; (ii) the web page is deployed on an enterprise network for use within the enterprise; (iii) the web page is deployed in a local area network; and/or (iv) the web page is deployed in any environment and made available for use by an appropriate user population.

Heat map module 302 monitors usage of the web page UI, gathers usage data, and generates a heat map based on the usage data.

Configuration module 306, based on the heat map in combination with configuration file 308, generates a modified configuration file.

In some embodiments, configuration module 306 passes the modified configuration file to rendering module 304 for deployment once rendering module receives a triggering signal.

In some embodiments, configuration module 306 sends a modified configuration file to a developer machine, where in response, rendering module 304 renders an updated user interface on a developer display device. A developer approves or rejects the updated user interface, and rendering module 304 respectively deploys, or does not deploy, the updated user interface in response. In some embodiments, the developer further modifies the configuration file, by selectively accepting and/or rejecting certain aspects of the modified configuration file, and making other changes as well. Once the developer approves the modified user interface, the developer sends the corresponding modified configuration file to rendering module 304. Rendering module 304 stands ready to render and deploy the modified user interface on receipt of a triggering signal.

In some embodiments, actions described above with respect to FIG. 6 proceed in a continuous fashion, iterating indefinitely. In this way, an optimized user interface develops, and if user behavior changes, the user interface adapts to the changes.

Figure 7:
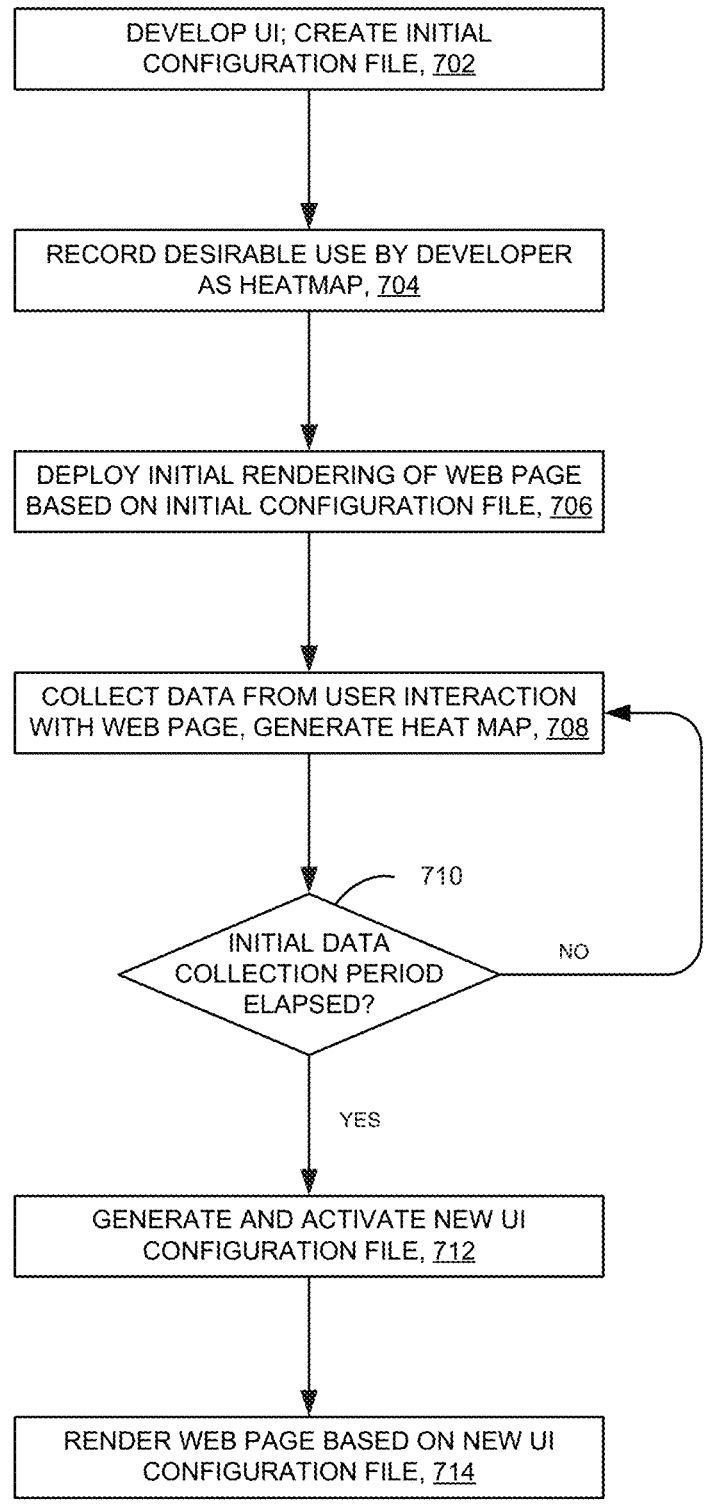
FIG. 7 is a flowchart showing a method performed, at least in part, in accordance with at least one embodiment of the present invention.

FIG. 7 is a flowchart of a method in accordance with some embodiments of the present invention. Processing begins at operation 702, where a developer creates an initial user interface and a corresponding initial configuration file for a web page.

Processing proceeds at operation 704, where the developer generates an expected heat map, corresponding to an expected, and/or intended, pattern of user interaction with the web page.

Processing proceeds at operation 706, where web server 200 (see FIG. 1) deploys the web page on the internet (meaning web server 200, is configured to respond to incoming client requests for the web page, by serving the web page to requesting client machines). Rendering module 304 (see FIG. 3), renders the initial web page user interface for display on client machines.

Processing proceeds at operation 708 where heat map module 302 (see FIG. 3) collects data on user interactions with the web page, and continues collecting the data for at least a data collection period. In some embodiments, the length of the data collection period is based on one or more of the following factors (without limitation): (i) elapsed time since web page deployment; (ii) number of web page visitors over the data collection period; (iii) number of unique web page visitors over the data collection period; and/or (iv) ratio of repeat web page visitors to unique web page visitors during data collection period, etc. During the data collection period, heat map module 302 generates a heat map based on the data collected. The data collection period comprises iteration of operation 708 and decision 710, "No" branch.

Once the data collection period has elapsed (decision 710, "Yes" branch), processing proceeds at operation 712, where configuration module 306 modifies configuration file 308 based on information in the heat map.

Processing proceeds at operation 714, where rendering module 304 generates a modified user interface for the web page, based on the modified configuration file 308.

Some embodiments of the present invention may include one, or more, of the following features, characteristics, and/or advantages: (i) a configuration system dynamically updates a product user interface based on one or more heat maps, leading to improvement in user experiences; (ii) configuration system uses both heat maps of general users and expert users (who are knowledgeable with respect to correct use of the product), to improve the user interface which in turn improves overall user experiences; (iii) configuration system and rendering engine work in concert to generate screens (user interfaces) customized to the role of the user (for example, general user vs. expert user), based on code (for example, HTML, code) operating in conjunction with a configuration file; (iv) developer workload is reduced with respect to creating and maintaining an application (a web site for example); and/or (v) a configuration file comprises properties such as a size, a scaling factor, a movable range, and screen coordinates of a user interface component.

Some embodiments of the present invention perform the following method for dynamically improving a user interface of a Web page, the method comprising: (i) receiving a user input to a Web page drawn in accordance with an initial configuration file defining properties of UI components constituting the user interface; (ii) obtaining input distribution information including frequencies of the user input to the UI components; (iii) generating a new configuration file for the user interface at least on the basis of the properties of the UI components and the obtained input distribution information; and (iv) re-rendering the Web page in accordance with the new configuration file.

In some embodiments of the present invention, generating the new configuration file comprises: (i) determining component adjustment values on the basis of the obtained input distribution information and at least one of: (a) an optimal input distribution information corresponding to a desirable use situation of the user interface and (b) per-attribute input distribution information determined on the basis of attribute information of the user; and (ii) determining new values of the properties of the UI components, which new values are to be defined in the new configuration file, on the basis of the values of the properties defined in the initial configuration file and the component adjustment values. The properties comprise at least one of a size, a scaling degree, a movable range, and screen coordinates of the UI component.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

User/subscriber: includes, but is not necessarily limited to, the following: (i) a single individual human; (ii) an artificial intelligence entity with sufficient intelligence to act as a user or subscriber; and/or (iii) a group of related users or subscribers.

Data communication: any sort of data communication scheme now known or to be developed in the future, including wireless communication, wired communication and communication routes that have wireless and wired portions; data communication is not necessarily limited to: (i) direct data communication; (ii) indirect data communication; and/or (iii) data communication where the format, packetization status, medium, encryption status and/or protocol remains constant over the entire course of the data communication.

Receive/provide/send/input/output/report: unless otherwise explicitly specified, these words should not be taken to imply: (i) any particular degree of directness with respect to the relationship between their objects and subjects; and/or (ii) absence of intermediate components, actions and/or things interposed between their objects and subjects.

Without substantial human intervention: a process that occurs automatically (often by operation of machine logic, such as software) with little or no human input; some examples that involve "no substantial human intervention" include: (i) computer is performing complex processing and a human switches the computer to an alternative power supply due to an outage of grid power so that processing continues uninterrupted; (ii) computer is about to perform resource intensive processing, and human confirms that the resource-intensive processing should indeed be undertaken (in this case, the process of confirmation, considered in isolation, is with substantial human intervention, but the resource intensive processing does not include any substantial human intervention, notwithstanding the simple yes-no style confirmation required to be made by a human); and (iii) using machine logic, a computer has made a weighty decision (for example, a decision to ground all airplanes in anticipation of bad weather), but, before implementing the weighty decision the computer must obtain simple yes-no style confirmation from a human source.

Automatically: without any human intervention.

Module/Sub-Module: any set of hardware, firmware and/or software that operatively works to do some kind of function, without regard as to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, and/or application-specific integrated circuit (ASIC) based devices.

What is claimed is:

1. A computer-implemented method comprising:
receiving a first configuration file, associated with a first user interaction dataset, with respect to a software application user interface comprising a user interface component;
receiving a weighting factor dataset;
sending, for presentation on a user interface device, the software application user interface configured in accordance with information in the first configuration file;
receiving usage data with respect to user interaction with the software application user interface, the usage data including usage information from one or more heat maps and the weighting factor dataset including information for assigning a weight to each type of heat map in the one or more heat maps;

generating a second user interaction dataset based on the usage data;

computing a weighted average user interaction dataset, based on information in (i) the first user interaction dataset, (ii) the second user interaction dataset, and (iii) the weighting factor dataset;

generating a second configuration file based on the first configuration file, the weighted average user interaction dataset, and a monotonically increasing function; and sending, for presentation on the user interface device, the user interface component configured in accordance with information in the second configuration file.

2. The method of claim 1, wherein:

the first configuration file comprises a display parameter, with respect to the user interface component, selected from the group consisting of:

a size parameter, a location parameter, a bounding parameter, a color parameter, a brightness parameter, a contrast parameter, an animation parameter, an audio parameter, an angular orientation parameter, an autoplay parameter, and a delay parameter.

3. The method of claim 1, wherein the usage data is associated with (i) a plurality of user sessions, (ii) a plurality of users, and (iii) a plurality of user interface devices.

4. The method of claim 2, wherein generating the second configuration file comprises: computing a scaling factor based on (i) information in the first configuration file, (ii) information in the second user interaction dataset, and (iii) the monotonically increasing function.

5. The method of claim 4, wherein the monotonically increasing function is a hyperbolic tangent function.

6. The method of claim 4, further comprising:
modifying the display parameter based on the scaling factor.

7. The method of claim 1, wherein the user interface device comprises a web browser.

8. A computer program product comprising:

one or more computer readable storage media, and program instructions collectively stored on the one or more computer readable storage media, the program instructions comprising instructions to perform:

receiving a first configuration file, associated with a first user interaction dataset, with respect to a software application user interface comprising a user interface component;

receiving a weighting factor dataset;

sending, for presentation on a user interface device, the software application user interface configured in accordance with information in the first configuration file;

receiving usage data with respect to user interaction with the software application user interface, the usage data including usage information from one or more heat maps and the weighting factor dataset including information for assigning a weight to each type of heat map in the one or more heat maps;

generating a second user interaction dataset based on the usage data;

computing a weighted average user interaction dataset, based on information in (i) the first user interaction dataset, (ii) the second user interaction dataset, and (iii) the weighting factor dataset;

generating a second configuration file based on the first configuration file, the weighted average user interaction dataset, and a monotonically increasing function; and sending, for presentation on the user interface device, the user interface component configured in accordance with information in the second configuration file.

9. The computer program product of claim 8, wherein:

the first configuration file comprises a display parameter, with respect to the user interface component, selected from the group consisting of:

a size parameter, a location parameter, a bounding parameter, a color parameter, a brightness parameter, a contrast parameter, an animation parameter, an audio parameter, an angular orientation parameter, an autoplay parameter, and a delay parameter.

10. The computer program product of claim 8, wherein the usage data is associated with (i) a plurality of user sessions, (ii) a plurality of users, and (iii) a plurality of user interface devices.

11. The computer program product of claim 9, wherein generating the second configuration file comprises:

computing a scaling factor based on (i) information in the first configuration file, (ii) information in the second user interaction dataset, and (iii) the monotonically increasing function.

12. The computer program product of claim 11, wherein the monotonically increasing function is a hyperbolic tangent function.

13. The computer program product of claim 11, further comprising: modifying the display parameter based on the scaling factor.

14. The computer program product of claim 8, wherein the user interface device comprises a web browser.

15. A computer system comprising:

a processor set; and one or more computer readable storage media; wherein:

the processor set is structured, located, connected and/or programmed to run program instructions stored on the one or more computer readable storage media; and the program instructions include instructions programmed to perform:

receiving a first configuration file, associated with a first user interaction dataset, with respect to a software application user interface comprising a user interface component;

receiving a weighting factor dataset;

sending, for presentation on a user interface device, the software application user interface configured in accordance with information in the first configuration file;

receiving usage data with respect to user interaction with the software application user interface, the usage data including usage information from one or more heat maps and the weighting factor dataset including information for assigning a weight to each type of heat map in the one or more heat maps;

generating a second user interaction dataset based on the usage data;

computing a weighted average user interaction dataset, based on information in (i) the first user interaction dataset, (ii) the second user interaction dataset, and (iii) the weighting factor dataset;

generating a second configuration file based on the first configuration file, the weighted average user interaction dataset, and a monotonically increasing function; and sending, for presentation on the user interface device, the user interface component configured in accordance with information in the second configuration file.

16. The computer system of claim 15, wherein:
the first configuration file comprises a display parameter, with respect to the user interface component, selected from the group consisting of:
a size parameter, a location parameter, a bounding parameter, a color parameter, a brightness parameter, a contrast parameter, an animation parameter, an audio parameter, an angular orientation parameter, an autoplay parameter, and a delay parameter.

17. The computer system of claim 15, wherein the usage data is associated with (i) a plurality of user sessions, (ii) a plurality of users, and (iii) a plurality of user interface devices.

18. The computer system of claim 16, wherein generating the second configuration file comprises:
computing a scaling factor based on (i) information in the first configuration file, (ii) information in the second user interaction dataset, and (iii) the monotonically increasing function.

19. The computer system of claim 18, wherein the monotonically increasing function is a hyperbolic tangent function.

20. The computer system of claim 18, further comprising: modifying the display parameter based on the scaling factor.

* * * * *